(12) United States Patent
Chou et al.

(10) Patent No.: US 10,839,055 B2
(45) Date of Patent: Nov. 17, 2020

(54) STORAGE APPARATUS MANAGING METHOD AND STORAGE APPARATUS MANAGING SYSTEM

(71) Applicant: Silicon Motion Inc., Hsinchu County (TW)

(72) Inventors: Li-Ling Chou, New Taipei (TW); Chao-Yu Lin, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 266 days.

(21) Appl. No.: 16/019,561

(22) Filed: Jun. 27, 2018

(65) Prior Publication Data

US 2018/0373854 A1 Dec. 27, 2018

Related U.S. Application Data

(60) Provisional application No. 62/525,223, filed on Jun. 27, 2017.

(30) Foreign Application Priority Data

Jan. 2, 2018 (TW) .............................. 107100034 A

(51) Int. Cl.
*G06F 21/31* (2013.01)
*G06F 21/45* (2013.01)
(Continued)

(52) U.S. Cl.
CPC .............. *G06F 21/31* (2013.01); *G06F 21/45* (2013.01); *G06F 21/602* (2013.01); *G06F 21/6218* (2013.01); *G06F 21/79* (2013.01)

(58) Field of Classification Search
None
See application file for complete search history.

(56) References Cited

U.S. PATENT DOCUMENTS 8,122,180 B2 * 2/2012 Chiou ................. G06F 12/0246
711/103
8,898,807 B2 11/2014 Chen
(Continued)

FOREIGN PATENT DOCUMENTS

CN 202694325 U 1/2013
EP 2521065 A2 11/2012
(Continued)

*Primary Examiner* — Kambiz Zand
*Assistant Examiner* — Arezoo Sherkat
(74) *Attorney, Agent, or Firm* — Winston Hsu

(57) ABSTRACT

A storage apparatus managing method, applied to a storage apparatus connected to a portable electronic apparatus, includes: (a) receiving authentication information via the portable electronic apparatus or the storage apparatus; (b) transmitting at least one confirmation command to a control module via a storage management program in the portable electronic apparatus, wherein the confirmation command is arranged to confirm whether the control module is in a ready state; (c) controlling the portable electronic apparatus to be capable of reading from or writing to an encrypted data region of the storage apparatus, when the control module is confirmed to be in the ready state and the authentication information matches predetermined authentication information; and (d) controlling the portable electronic apparatus to be incapable of accessing the encrypted data region when the authentication information does not match the predetermined authentication information.

26 Claims, 12 Drawing Sheets

(51) Int. Cl.
*G06F 21/60* (2013.01)
*G06F 21/62* (2013.01)
*G06F 21/79* (2013.01)

(56) References Cited

U.S. PATENT DOCUMENTS

| | | | |
|---|---|---|---|
| 2008/0209547 A1* | 8/2008 | Funahashi | G06F 21/78 |
| | | | 726/20 |
| 2013/0010959 A1 | 1/2013 | Shin | |
| 2013/0067564 A1* | 3/2013 | Fok Ah Chuen | G06F 21/6218 |
| | | | 726/17 |
| 2014/0143545 A1* | 5/2014 | McKeeman | H04L 63/0853 |
| | | | 713/168 |

FOREIGN PATENT DOCUMENTS

| | | |
|---|---|---|
| TW | 201245956 A1 | 11/2012 |
| TW | I479358 B | 4/2015 |

* cited by examiner

STORAGE APPARATUS MANAGING METHOD AND STORAGE APPARATUS MANAGING SYSTEM

CROSS REFERENCE TO RELATED APPLICATIONS

This application claims the benefit of U.S. Provisional Application No. 62/525,223, filed on Jun. 27, 2017 and incorporated herein by reference.

BACKGROUND OF THE INVENTION

1. Field of the Invention

The present invention relates to a storage apparatus managing method and storage apparatus managing system, and more particularly, to a storage apparatus managing method capable of performing encryption on storage apparatuses, and an associated storage apparatus managing system.

2. Description of the Prior Art

In recent years, portable electronic apparatuses, such as smart phones, tablets, and wearable electronic apparatuses, have become increasingly popular. Portable electronic apparatuses usually suffer from the problem of insufficient storage space. A way to improve the storage space of a portable electronic apparatus is either by increasing the built-in storage space or inserting an external memory card. Portable electronic apparatuses with larger built-in storage space are inevitably much more expensive, however. In addition, since the size of a memory card is quite small, it could easily be lost after removing it from a portable electronic apparatus. Moreover, some portable electronic apparatuses do not even support the use of an external memory card.

Hence, dedicated flash disks for portable electronic apparatuses have become more common. This type of flash disk provides larger storage space for portable electronic apparatuses, and can be carried conveniently. Flash disks used for portable electronic apparatuses usually lack the encryption function, however, making the data stored therein vulnerable to hacking or attacks.

SUMMARY OF THE INVENTION

In view of the above, an objective of the present invention is to provide a storage apparatus managing method, which can provide encryption for the storage apparatus of a portable electronic apparatus.

Another objective of the present invention is to provide a storage apparatus managing system, which can provide encryption for the storage apparatus of a portable electronic apparatus.

An embodiment of the present invention provides a storage apparatus managing method, which is applicable to a storage apparatus connected to a portable electronic apparatus. The method comprises: (a) receiving authentication information via the portable electronic apparatus or the storage apparatus; (b) transmitting at least one confirmation command to a control module via a storage management program in the portable electronic apparatus, wherein the confirmation command is arranged to confirm whether the control module is in a ready state; (c) controlling the portable electronic apparatus to be capable of reading from or writing to an encrypted data region of the storage apparatus, when the control module is confirmed to be in the ready state and the authentication information matches predetermined authentication information; and (d) controlling the portable electronic apparatus to be incapable of accessing the encrypted data region of the storage apparatus, when the authentication information does not match the predetermined authentication information.

Another embodiment of the present invention provides a storage apparatus managing system which comprises a control module, wherein a portable electronic apparatus or a storage apparatus coupled to the portable electronic apparatus receives authentication information, a storage management program in the portable electronic apparatus transmits at least one confirmation command to the control module, and the confirmation command is arranged to confirm whether the control module is in a ready state; when the control module is confirmed to be in the ready state and the control module is notified that the authentication information matches predetermined authentication information, the storage management program controls the control module to make the portable electronic apparatus capable of reading from or writing to an encrypted data area of the storage apparatus; and when the authentication information does not match the predetermined authentication information, the storage management program controls the control module to make the portable electronic apparatus incapable of accessing the encrypted data area of the storage apparatus.

The embodiments mentioned above may provide proper data protection for the storage apparatus used by the portable electronic apparatus, in order to prevent the data stored in the storage apparatus from being hacked, thereby improving the convenience as well as the safety of the storage apparatus.

These and other objectives of the present invention will no doubt become obvious to those of ordinary skill in the art after reading the following detailed description of the preferred embodiment that is illustrated in the various figures and drawings.

DETAILED DESCRIPTION

In the following description, multiple embodiments are used to illustrate the technical features of the present invention. Please note that the elements in each embodiment may be implemented by hardware (such as circuits) or software (such as programs installed in a processor). Further, although a flash disk is illustrated in the following embodiments, the storage apparatus managing system and storage apparatus managing method provided by the present invention may also be applied to various storage apparatuses other than a flash disk.

Figure 1:
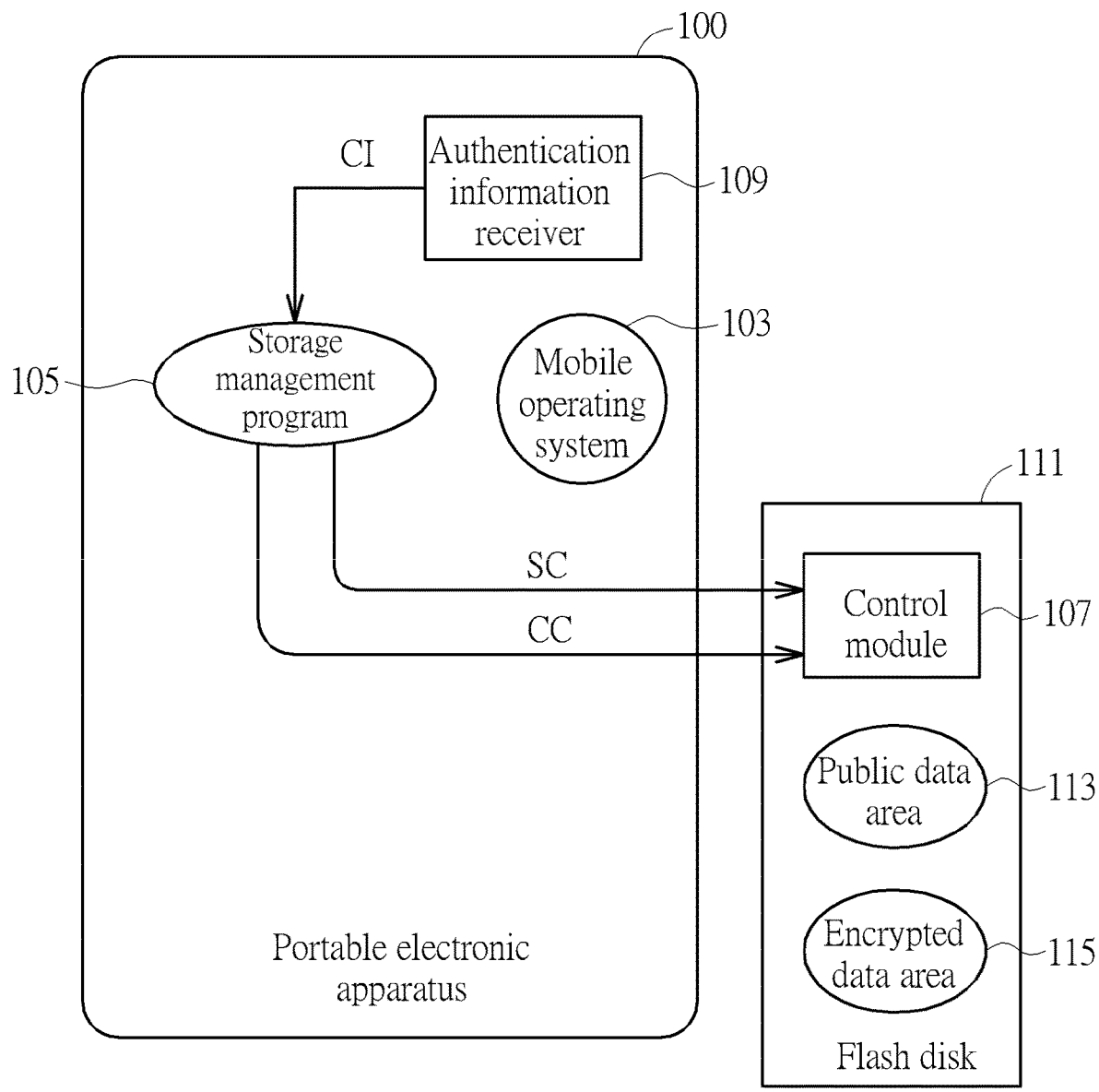
FIG. 1 is a block diagram of a storage apparatus managing system according to an embodiment of the present invention.

FIG. 1 is a block diagram of a storage apparatus managing system according to an embodiment of the present invention. Please note that, although in the embodiment of FIG. 1 the control module 107 is configured in the flash disk 111, the control module 107 can also be configured in the portable electronic apparatus 100 in other embodiments. As shown in FIG. 1, the portable electronic apparatus 100 comprises a storage management program 105, and the flash disk 111 comprises the control module 107. The storage management program 105 and the control module 107 may be jointly viewed as a storage apparatus managing system. The portable electronic apparatus 100 may be a smart device such as a smartphone, a tablet computer or a wearable apparatus. In an embodiment, the portable electronic apparatus 100 may operate in a mobile operating system 103, such as Android, Tizen, webOS, iOS, etc., but the present invention is not limited thereto. In an embodiment, if the portable electronic apparatus 100 operates under iOS, the flash disk 111 must support a specific file system such as FAT32 or exFAT. The storage management program 105 may be executed via a main processor, and this main processor may be a main processor of the portable electronic apparatus 100, which means this main processor is not only used to execute the storage management program 105, but may also be used to control other functions of the portable electronic apparatus 100. In an embodiment, the storage management program 105 is independent from the mobile operating system 103, which means the storage management program 105 is removable from the mobile operating system 103. In this way, although the portable electronic apparatus 100 cannot read the encrypted data area 115, other functions will not be influenced. The storage management program 105 may be any type of program. For example, in an embodiment, the storage management program 105 may be an application (App).

In an embodiment, the data area of the flash disk 111 comprises a public data area 113 and an encrypted data area 115. The public data area 113 does not need to be identified in advance: as long as the flash disk 111 is coupled to the portable electronic apparatus 100, anyone may read data of the public data area 113 or may store data into the public data area 113 via the portable electronic apparatus 100. An authentication process must be passed prior to reading from or writing to the encrypted data area 115 via the portable electronic apparatus 100. In an embodiment, the user must input the authentication information CI to the authentication information receiver 109 in the portable electronic apparatus 100, and then the storage management program 105 will determine whether the authentication information CI matches predetermined authentication information. If the authentication information CI matches predetermined authentication information, the authentication process is passed (i.e. authentication succeeds); if the authentication information CI does not match the predetermined authentication information, the authentication process is not passed (i.e. authentication fails).

The authentication information CI and the predetermined authentication information may be any type of information. For example, the authentication information CI may be a set of a user account and a password, the predetermined authentication information may be a set of a predetermined user account and a password, and the authentication information receiver 109 may be a user input interface, such as a touch screen. In another example, the authentication information CI may be a fingerprint; correspondingly, the predetermined authentication information may be a predetermined fingerprint and the authentication information receiver 109 may be a fingerprint identifier. Further, the authentication information CI may be other type of information that can be used for authentication, such as voiceprints, iris information, face information, etc. Since there are many types of information that can be used for authentication, detailed illustrations thereof are omitted here for brevity.

After the storage management program 105 determines that the authentication information CI matches the predetermined authentication information, the storage management program 105 will transmit a switching command SC to the control module 107, in order to control the control module 107 to switch the flash disk 111 from the public data area 113 to the encrypted data area 115. In an embodiment, the storage management program 105 may transmit a confirmation command CC to the control module 107. The confirmation command CC is arranged to confirm whether the control module 107 is ready for reading from or writing to the flash disk 111. Hence, in an embodiment, the flash disk 111 will be switched only when the control module 107 has reported the state of readiness and the control module 107 has received the switching command SC.

In an embodiment, the storage management program 105 generates the confirmation command CC to the control module 107 immediately after the user inputs the authentication information CI, while in another embodiment the storage management program 105 generates the confirmation command CC to the control module 107 after confirming that the authentication information CI matches specific authentication information.

Further, in an embodiment, the storage management program 105 may transmit the confirmation command CC to the control module 107 twice within a predetermined period. The storage management program 105 may successively transmit the confirmation command CC to the control module 107 twice, or may transmit the confirmation command CC for a second time after waiting for a cool down period following the first time of transmitting the confirmation command CC. In this embodiment, the flash disk 111 will only be switched when: the control module 107 has correspondingly reported about the two confirmation commands CC, the ready state has been entered twice, and the control module 107 has received the switching command SC. Since the storage management program 105 performs the confirmation twice, a situation where the control module 107 mistakenly switches the flash disk 111 can be avoided.

The confirmation command CC may have a different format under a different specification. For example, the confirmation command CC may be the TEST UNIT READY command in the Small Computer System Interface (SCSI) specification, but the present invention is not limited to the SCSI specification only.

The above-mentioned "switching" means the portable electronic apparatus 100 is previously allowed to read from or write to the public data area 113 only, and the authority of the portable electronic apparatus 100 is now "switched" to allow for reading from or writing to the encrypted data area 115 instead. In an embodiment, the flash disk 111 stores address messages that record which addresses should belong to the public data area 113 and which addresses should belong to the encrypted data area 115. For example, the addresses belonging to the public data area 113 are LBA0-LBAN, and the addresses belonging to the encrypted data area 115 are LBA(N+1)-LBAM. Originally, the file system in the flash disk 111 sets the readable and writable addresses as LBA0-LBAN, and therefore the portable electronic apparatus 100 can read from or write to the public data area 113 only. When attempting to switch to the encrypted data area 115, the control module 107 will ask the file system in the flash disk 111 to set the readable and writable addresses as LBA(N+1)-LBAM, so that the portable electronic apparatus 100 can read from the encrypted data area 115.

Figure 2:
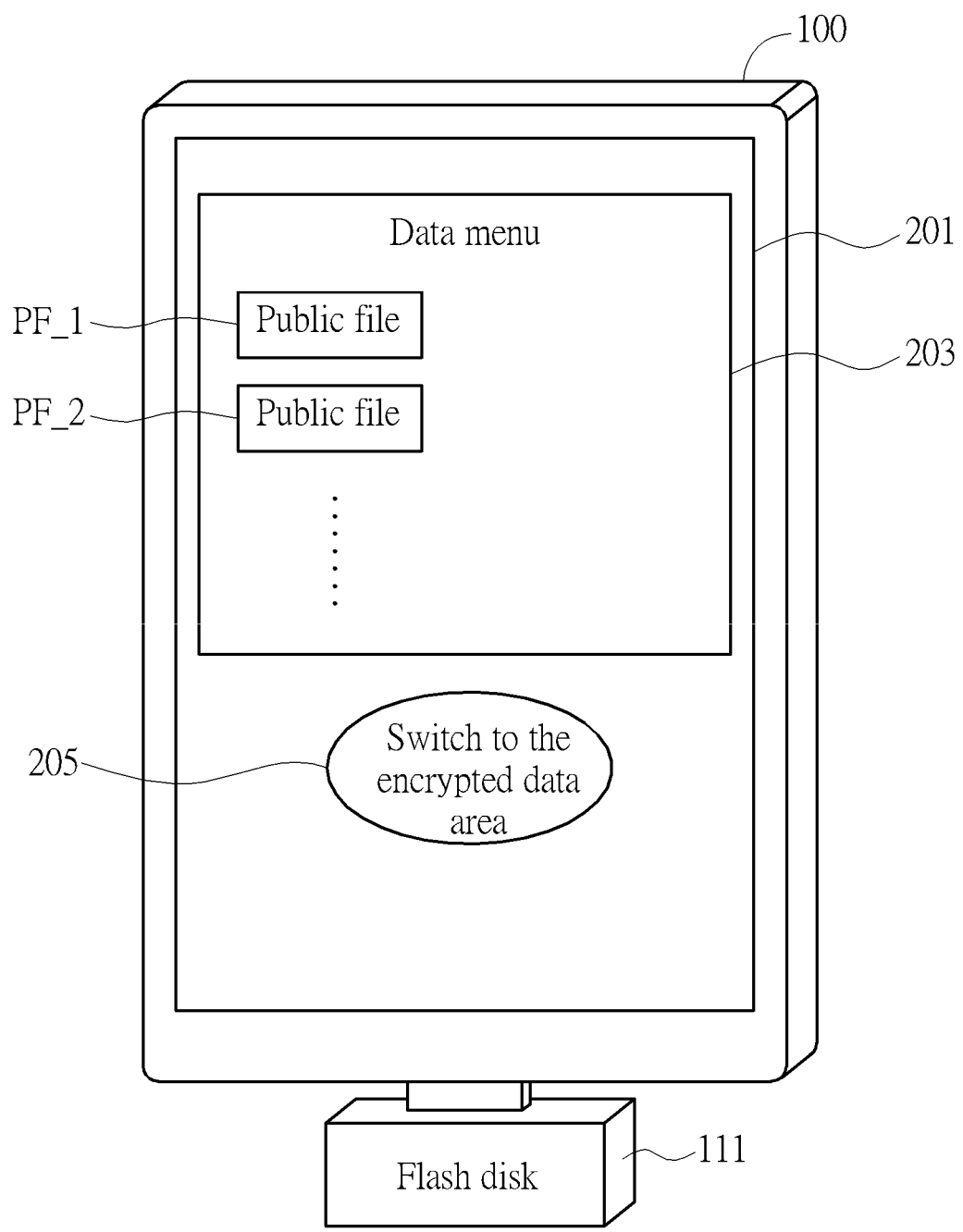
FIGS. 2-4 are diagrams illustrating practical usages of the storage apparatus managing system shown in FIG. 1.
Figure 3:
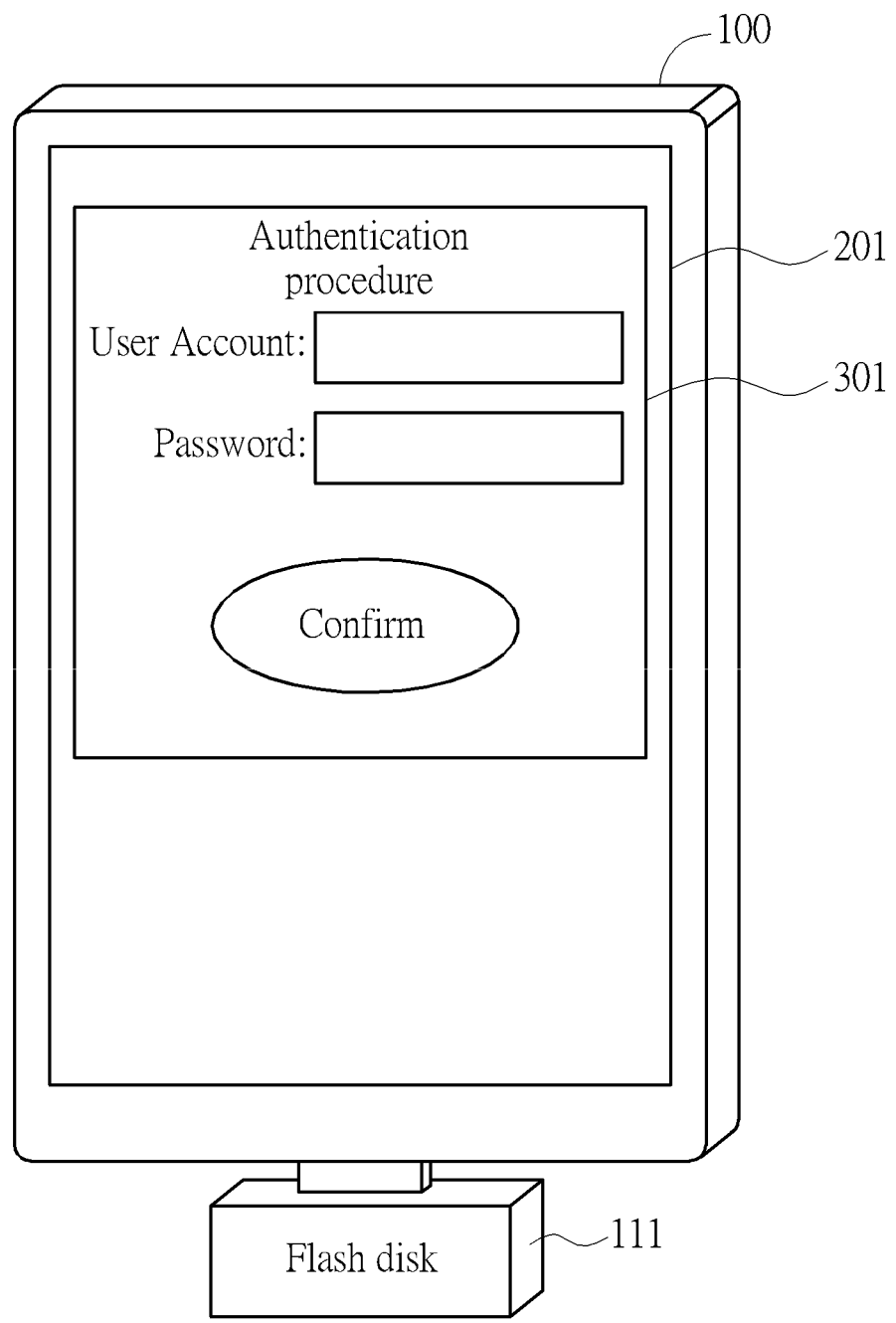
Figure 4:
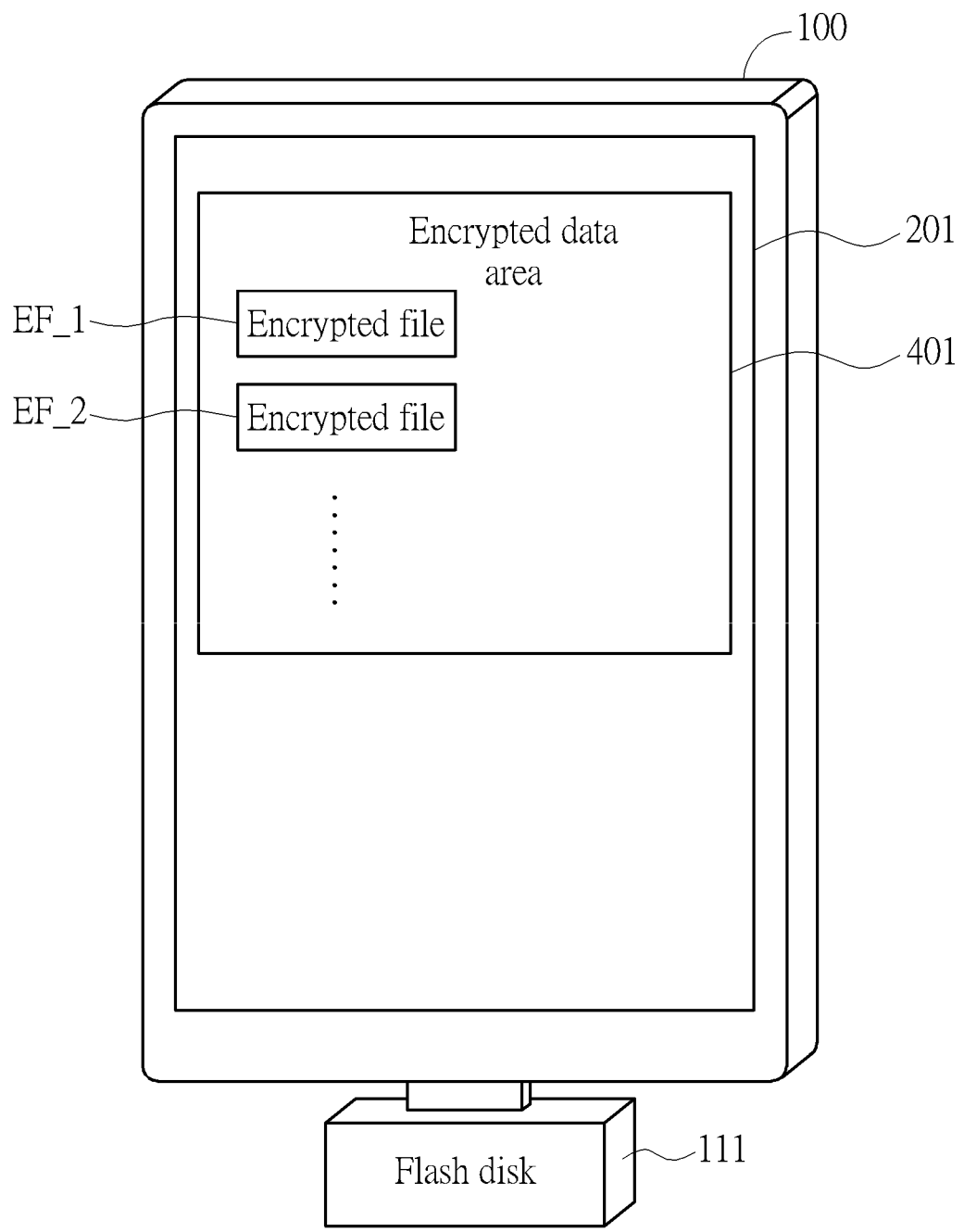

FIGS. 2-4 are diagrams illustrating practical usages of the storage apparatus managing system shown in FIG. 1. Please note that these examples are only for illustrating possible configurations of the portable electronic apparatus of the storage apparatus managing system provided by the present invention. The arrangement, positions, and operation orders shown in these examples should not be viewed as limitations of the present invention.

As shown in FIG. 2, the portable electronic apparatus 100 comprises a display screen 201 (which is a touch screen in this example). When the flash disk 111 is coupled to the portable electronic apparatus 100, the portable electronic apparatus 100 is preset as capable of reading from or writing to the above-mentioned the public data area 113. Hence, the portable electronic apparatus 100 may display a data menu 203, and the data menu 203 will correspondingly show public files PF_1 and PF_2 in the public data area 113. The user may read data of the public data area 113 or write data to the public data area 113 via the data menu 203. The user may click a switching icon 205 to make the portable electronic apparatus 100 switch to reading from the encrypted data area 115.

As mentioned above, the authentication process must be passed before switching to the encrypted data area 115. In the example of FIG. 3, the authentication information is a set of a user account and a password. Hence, as shown in FIG. 3, the portable electronic apparatus 100 will display an authentication menu 301 for the user to input the user account and password, wherein the display screen 201 may be an example of the authentication information receiver 109 shown in FIG. 1, and the user account and password inputted by the user may be an example of the authentication information CI shown in FIG. 1. If the storage management program (e.g. the element 105 in FIG. 1) of the portable electronic apparatus 100 confirms that the user account and password match the predetermined user account and password, the storage management program will switch the flash disk 111 to reading from the encrypted data area 115. As shown in FIG. 4, the display screen 201 displays a data menu 401 which allows the user to read encrypted files EF1, EF2 . . . , or allows for adding data to the encrypted data area 115. If the authentication information is any other type of message, the authentication menu 301 may only show a message to notify the user to input authentication information via the authentication information receiver on the portable electronic apparatus 100, which may be a camera, fingerprint identifier, etc.

In an embodiment, the flash disk 111 only has an encrypted data area and does not have a public data area. In this situation, after the flash disk 111 is coupled to the portable electronic apparatus 100, an authentication menu (e.g. the one in FIG. 3) will be shown, but the public data area (e.g. the one in FIG. 2) will not be shown. Any modification or combination made on the above technique shall fall within the scope of the present invention.

Figure 5:
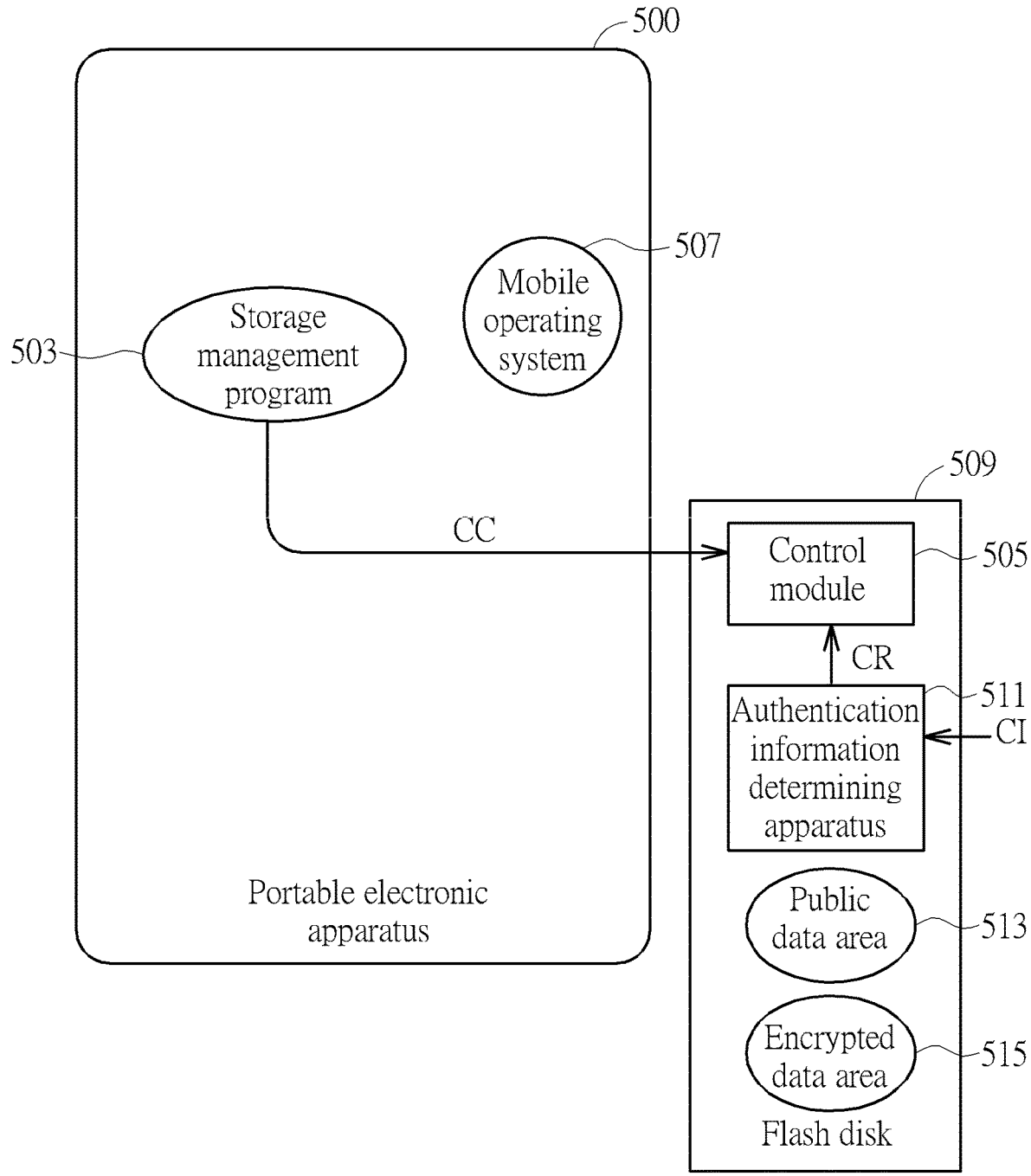
FIG. 5 is a block diagram of a storage apparatus managing system according to another embodiment of the present invention.

The above-mentioned embodiments all utilize the portable electronic apparatus to receive the authentication information. In other embodiments, however, the flash disk can be utilized instead to receive the authentication information. FIG. 5 is a block diagram of a storage apparatus managing system according to another embodiment of the present invention. In the embodiment of FIG. 5, the control module 505 is placed in the flash disk 509, while in other embodiments the control module 505 can be configured in the portable electronic apparatus 500 instead. As shown in FIG. 5, the portable electronic apparatus 500 comprises a storage management program 503, and the flash disk 509 comprises a control module 505. The storage management program 503 and the control module 505 may be jointly viewed as a storage apparatus managing system. In an embodiment, the portable electronic apparatus 500 operates in a mobile operating system 507, such as Android, Tizen, webOS, iOS, etc., but the present invention is not limited thereto. In an embodiment, if the portable electronic apparatus 500 operates under iOS, the flash disk 509 must support a specific file system such as FAT32 or exFAT. The details of the storage management program 503, the control module 505 and the mobile operating system 507 are similar or identical to those of the storage management program 105, the control module 107 and the mobile operating system 103 shown in FIG. 1, and are omitted here for brevity.

The flash disk 509 further comprises an authentication information determining apparatus 511, and its data areas comprise a public data area 513 and an encrypted data area 515. In addition to receiving the authentication information CI, the authentication information determining apparatus 511 may further determine whether the authentication information CI matches the predetermined authentication information, and will transmit the determination result CR to the control module 505. If the determination result CR indicates that the authentication information CI matches the predetermined authentication information, the control module 505 will control the flash disk 509 to switch from the public data area 513 to the encrypted data area 515. In an embodiment, the authentication information determining apparatus 511 can only receive the authentication information CI, and will transmit the received authentication information CI to the storage management program 503, for the storage management program 503 to determine whether the authentication information CI matches the predetermined authentication information. If the authentication information CI matches the predetermined authentication information, the storage management program 503 will transmit the switching command SC shown in FIG. 1 to the control module 505, in order to make the control module 505 perform switching on the flash disk 509.

In the embodiment of FIG. 5, the authentication information CI and the predetermined authentication information may be various types of message. For example, the authentication information CI may be a fingerprint; correspondingly, the predetermined authentication information may be a predetermined fingerprint and the authentication information determining apparatus 511 may be a fingerprint identifier. In another example, the authentication information CI may be a voiceprint; correspondingly, the predetermined authentication information may be a predetermined voiceprint, and the authentication information determining apparatus 511 may be a voiceprint identifier. Further, the authentication information CI may also be a message for authentication, such as an iris message. Since there are many types of message that can be used for authentication, the detailed illustrations are omitted here for brevity.

In an embodiment, since the authentication information determining apparatus 511 is located in the flash disk 509, the storage management program 503 cannot predict when the authentication information determining apparatus 511 will initiate the authentication. For example, if the authentication information determining apparatus 511 is a fingerprint identifier, the authentication will be initiated once a finger is placed on the authentication information determining apparatus 511. Hence, the storage management program 503 will continuously transmit the confirmation command CC to the control module 505. After confirming that the control module 505 is in a ready state and the determination result CR indicates that the authentication information CI matches the predetermined authentication information, the flash disk 509 will be controlled to perform switching. In an embodiment, the authentication information determining apparatus 511 transmits the authentication information CI to the storage management program 503, and the storage management program 503 will determine whether the authentication information CI matches the predetermined authentication information. If the authentication information CI matches the predetermined authentication information, the storage management program 503 will transmit the switching command SC as well as the confirmation command CC shown in FIG. 1 to the control module 505, to make the control module 505 perform switching on the flash disk 509. In this embodiment, the authentication information determining apparatus 511 may be replaced with an authentication information receiver. In another embodiment, the authentication information determining apparatus 511 will transmit the received determination result CR to the storage management program 503. If the determination result CR indicates that the authentication information CI matches the predetermined authentication information, the storage management program 503 will transmit the switching command SC as well as the confirmation command CC shown in FIG. 1 to the control module 505, to make the control module 505 perform switching on the flash disk 509.

Figure 6:
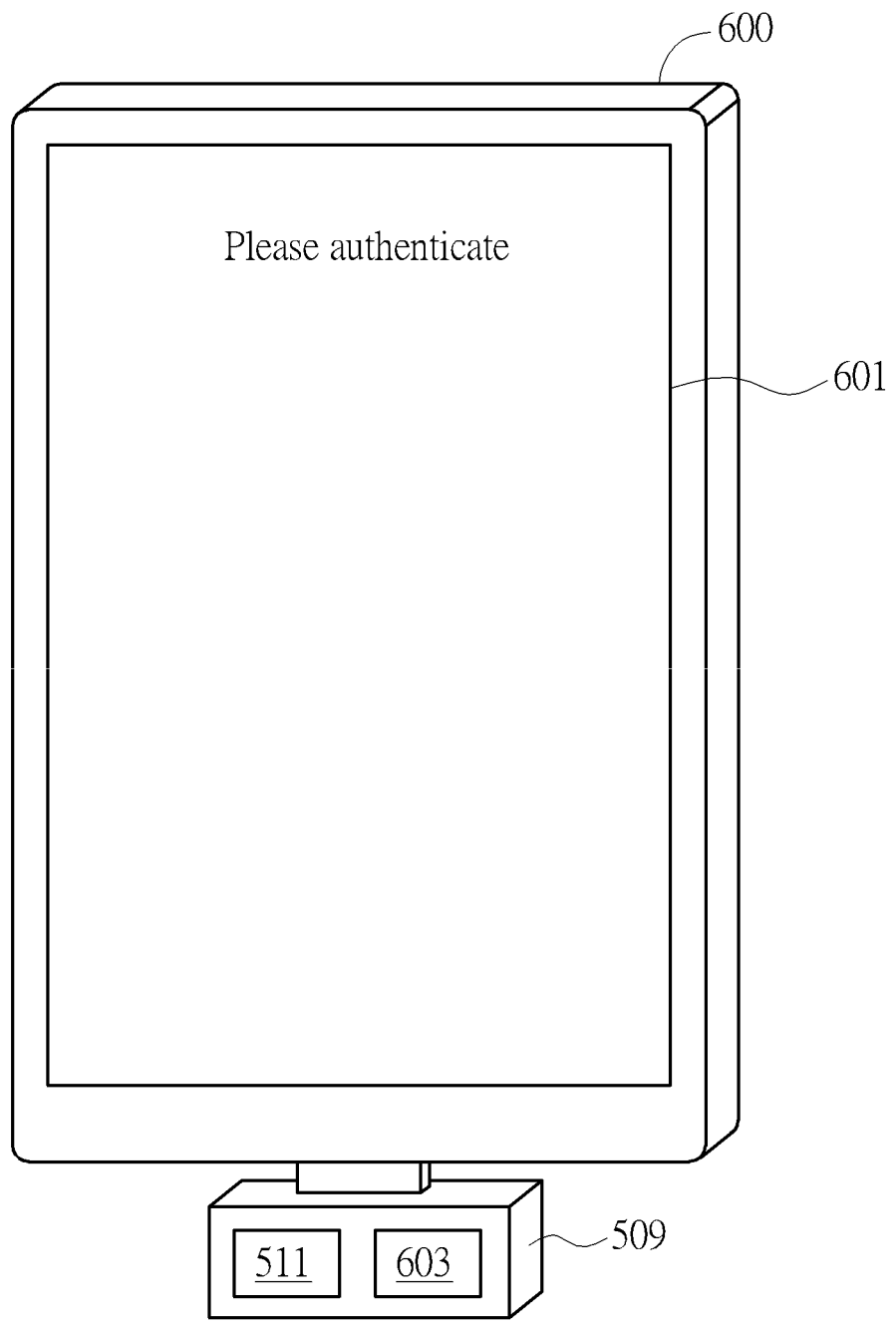
FIG. 6 is a diagram illustrating a practical usage of the storage apparatus managing system shown in FIG. 5.

FIG. 6 is a diagram illustrating a practical usage of the storage apparatus managing system shown in FIG. 5. When the flash disk 509 is coupled to the portable electronic apparatus 600, the display screen 601 in the portable electronic apparatus 600 will display a public data area such as that shown in FIG. 2 (not shown in FIG. 6). When the user passes the authentication via the authentication information identifier 511, the display screen 601 will display an encrypted data area (not shown in FIG. 6), such as that shown in FIG. 4.

In an embodiment, the flash disk 509 only has an encrypted data area and does not have a public data area. In this situation, after the flash disk 509 is coupled to the portable electronic apparatus 600, it will not display a public data area, as that depicted in FIG. 2. At this moment, the storage management program 503 will control the portable electronic apparatus 500, as depicted in FIG. 6, to show the message "Please authenticate" on the screen 601. Any modification or combination made on the above technique shall fall within the scope of the present invention. In an embodiment, the flash disk 509 may further comprise an indication area 603 for notifying the user whether the authentication succeeds or not, or the authentication information determining apparatus 511 will malfunction. For example, the indication area 603 may comprise at least one light source, which is capable of emitting light of a different color or intensity according to the variation of the state.

Figure 7:
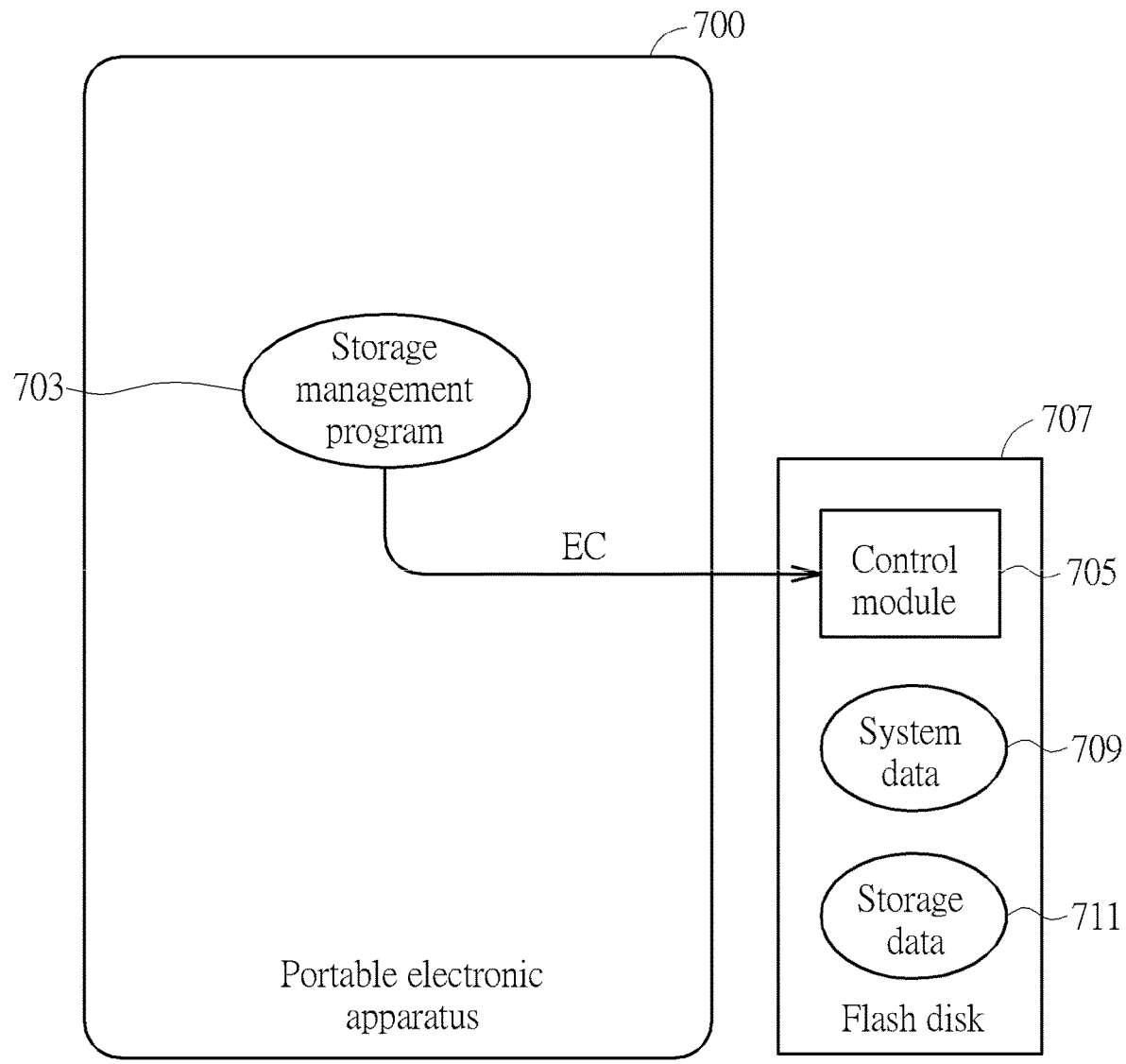
FIG. 7 is a block diagram of a storage apparatus managing system according to yet another embodiment of the present invention.

The present invention further provides a data protection method which is detailed in the embodiment below. FIG. 7 is a block diagram of a storage apparatus managing system according to yet another embodiment of the present invention. In the embodiment of FIG. 7, the control module 705 is illustrated as being placed in the flash disk 707, but the control module 705 may be configured in the portable electronic apparatus 700 instead in other embodiments. As shown in FIG. 7, the portable electronic apparatus 700 comprises a storage management program 703, and the flash disk 707 comprises the control module 705. The storage management program 703 counts how many times the authentication fails. For example, when the user inputs an incorrect user account or password onto the interface shown in FIG. 3, the authentication fail count will increase by 1. In the embodiment of FIG. 5, the storage management program 503 may also receive the determination result CR and generate an authentication fail count. When the authentication fail count is not smaller than (i.e. larger than or equal to) a fail threshold, the storage management program 703 will generate a deletion command EC to the control module 705, and then the control module 705 will perform a deletion operation on data of the flash disk 707.

In an embodiment, the deletion operation will merely delete the storage data 711 written into the flash disk 707 by the user, but will not delete the system data 709 which is arranged to control operations of the flash disk. In another embodiment, the storage data 711 will be deleted prior to the deletion of the system data 709, and all data (including blank data) will be deleted thereafter.

In an embodiment, the deletion operation may be a reversible deletion operation. For example, the control module 705 may delete the indexes from the storage data only, making the data unable to be found although it still exists in the original locations. In another embodiment, the deletion operation can be an irreversible deletion operation. For example, overwriting on the space where the data to-be-deleted is located can make the data to-be-deleted disappear permanently. Please note that the above reversible and irreversible deletion operations are merely for illustrative purposes, and are not limitations of the present invention.

Figure 8:
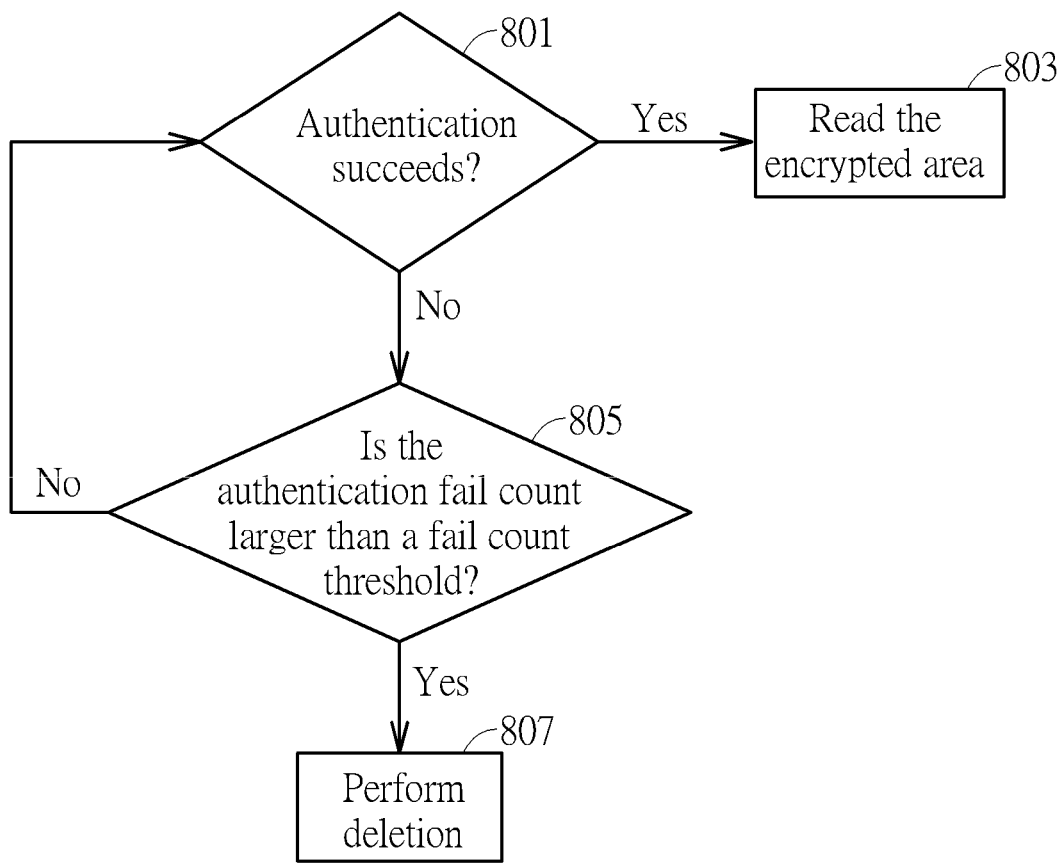
FIG. 8 is a flowchart illustrating partial steps of the embodiment shown in FIG. 7.

FIG. 8 is a flowchart illustrating partial steps of the embodiment shown in FIG. 7, comprising:

Step 801: Determine whether the authentication succeeds or not. If yes, Step 803 is entered; otherwise, Step 805 is entered.

Step 803: Read encrypted data area.

Step 805: Determine whether the authentication fail count is larger than a fail count threshold. If yes, Step 807 is entered; otherwise, the authentication fail count increases by 1, and the process returns to Step 801 to wait for a next authentication process.

Step 807: Perform deletion operation on the flash disk.

As mentioned above, in an embodiment, the deletion operation merely deletes the storage data written into the flash disk by the user, but does not delete the system data arranged to control operations of the flash disk. In another embodiment, the storage data is deleted prior to the deletion of the system data, and all data will be deleted thereafter. Further, in an embodiment, the deletion operation may be reversible.

Figure 9:
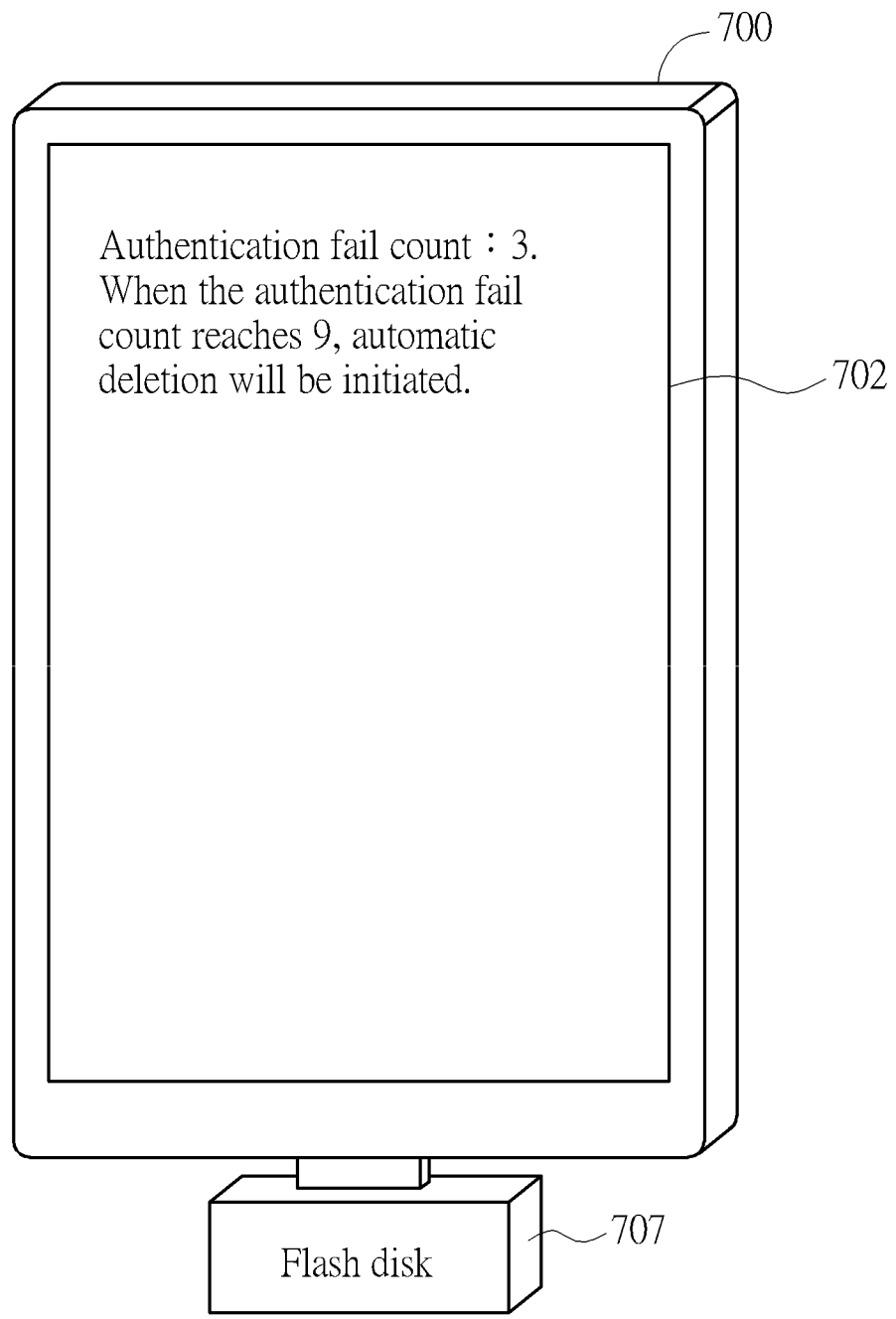
FIGS. 9-10 are diagrams illustrating practical usages of the storage apparatus managing system shown in FIG. 7.
Figure 10:
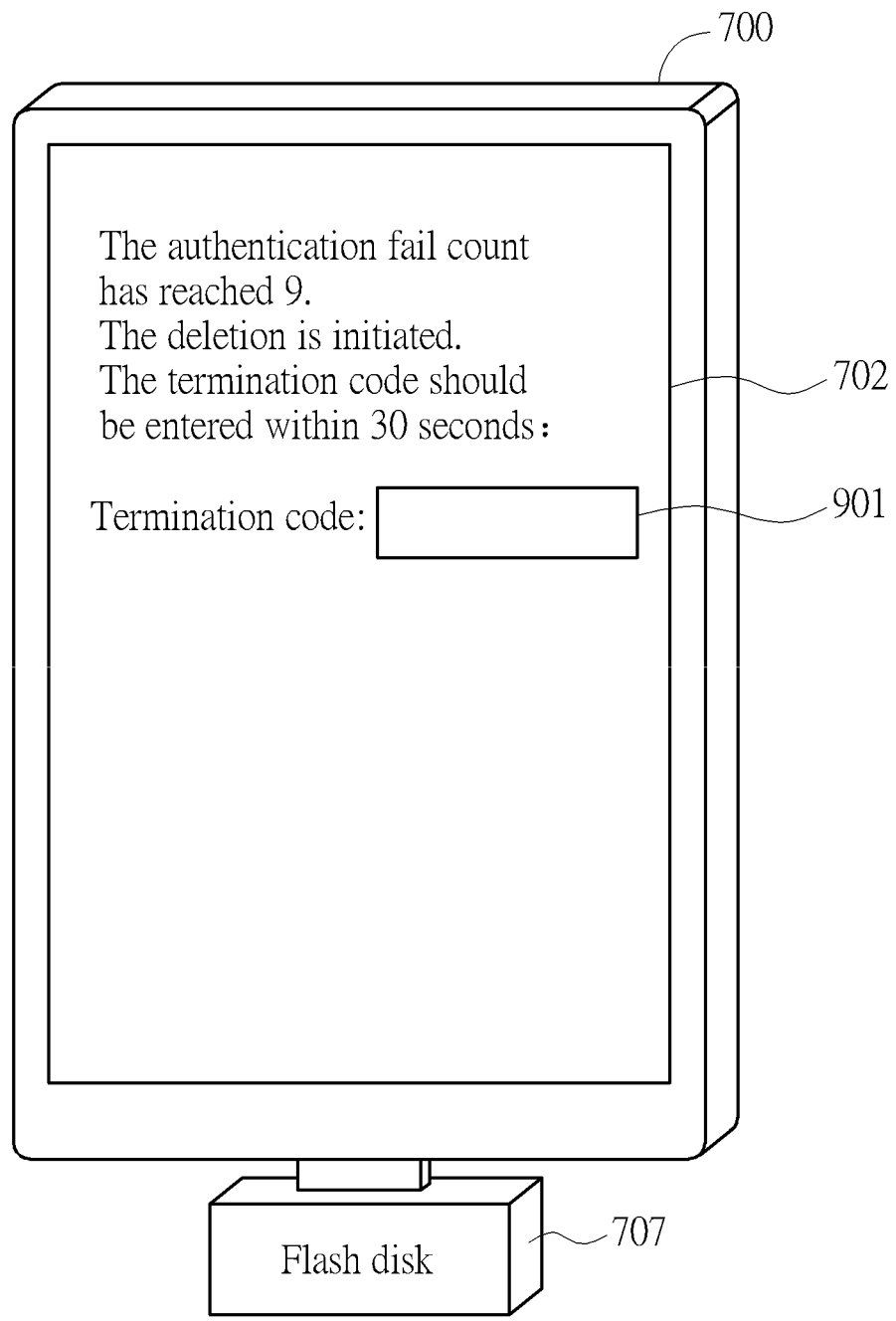

FIGS. 9-10 are diagrams illustrating practical usages of the storage apparatus managing system shown in FIG. 7. As shown in FIG. 9, when the flash disk 707 is coupled to the portable electronic apparatus 700 and a user authentication fail occurs, the display screen 702 of the portable electronic apparatus 700 will display a pop-up warning message. For example, the display screen 702 will show an authentication fail count, and notify the user that the deletion will be enabled once the authentication fail reaches a certain number. The above-mentioned storage management program can be set to enable or disable the popping up of the warning message. When the popping up of the warning message is disabled, the deletion operation will be performed directly once the authentication fail count reaches a certain number.

The embodiment of FIG. 10 further provides a termination procedure for terminating a deletion operation, to prevent mistakenly deleting data from the flash disk due to human errors or an incorrect authentication fail count. Before the storage management program begins the deletion operation, a warning message (such as that shown in FIG. 10) as well as a termination code input interface 901 will be shown to allow the user to abort the deletion operation by inputting a preset termination code. The enablement of the termination procedure, the popping up of the warning message, and the termination code, can be set in the above-mentioned storage management program.

Figure 11:
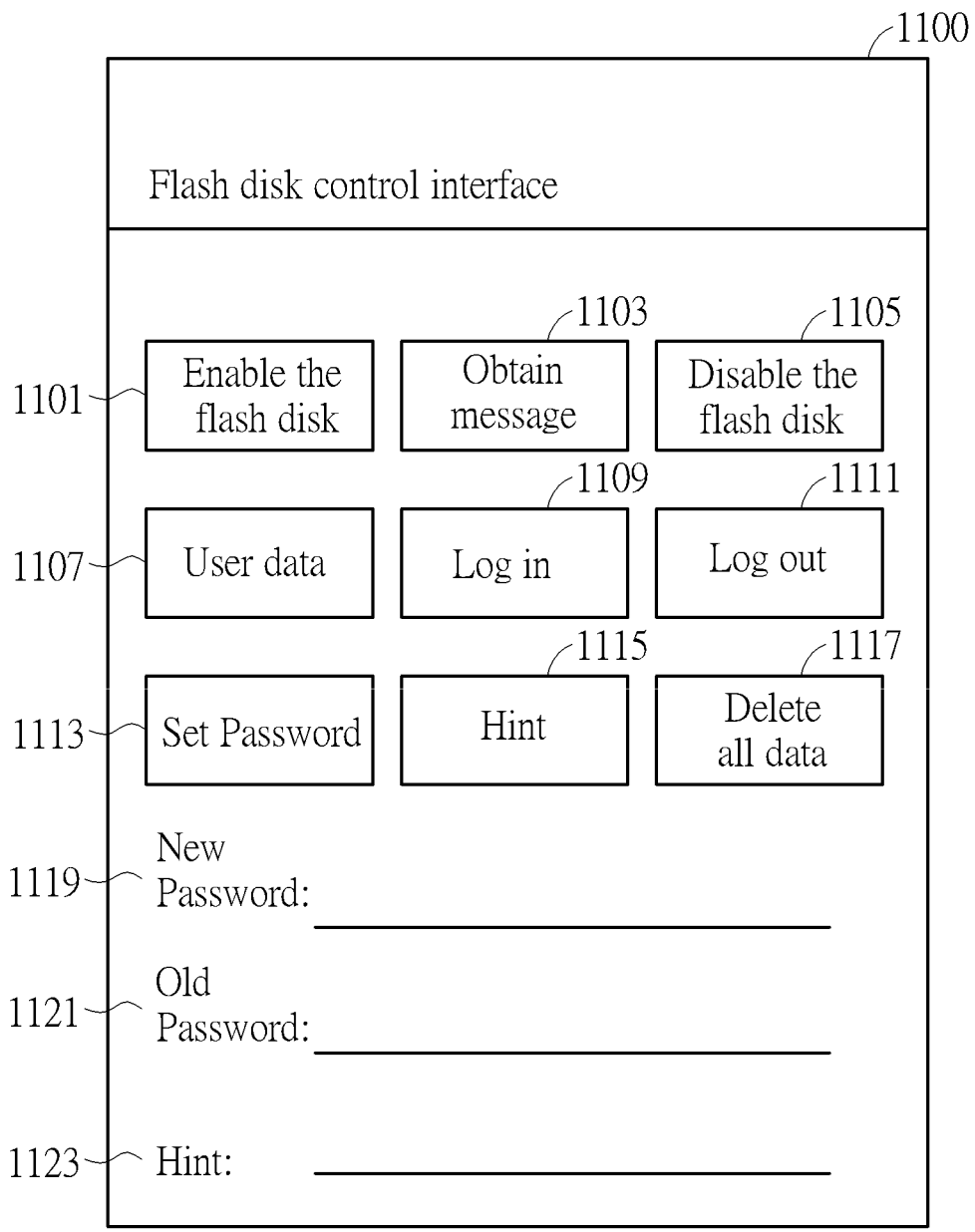
FIG. 11 is a diagram illustrating a flash disk control interface according to an embodiment of the present invention.

FIG. 11 is a diagram illustrating a flash disk control interface according to an embodiment of the present invention, which can be used to execute the above-mentioned embodiment. In an embodiment, the flash disk control interface shown in FIG. 11 operates under the Android system.

As shown in FIG. 11, Icon 1101 is arranged to enable the flash disk. Before logging in, only the data in the public data area can be read. Icon 1103 is arranged to obtain the hardware message of the flash disk, such as VID (Vendor ID) and PID (Product ID). Icon 1105 is arranged to disable the interface of reading the flash disk. Icon 1107 is arranged to display or modify messages of users, such as their names. Icon 1109 is arranged to log in the readable flash disk encryption area, wherein an interface (such as that shown in FIG. 3) will be shown after Icon 1109 is triggered. Icon 1111 is arranged to log out from the readable flash disk encryption area. Icon 1113 is arranged to modify the user password, and after the Icon 1113 is triggered, the user may change the password by keying in the current password and a new password to the password areas 1119 and 1121, respectively. Icon 1115 is arranged to display a hint on the hint area 1123 for the user, in order to provide useful information, e.g. password hint, to help the user solve problems. Icon 1117 is arranged to delete all data in the flash disk.

Figure 12:
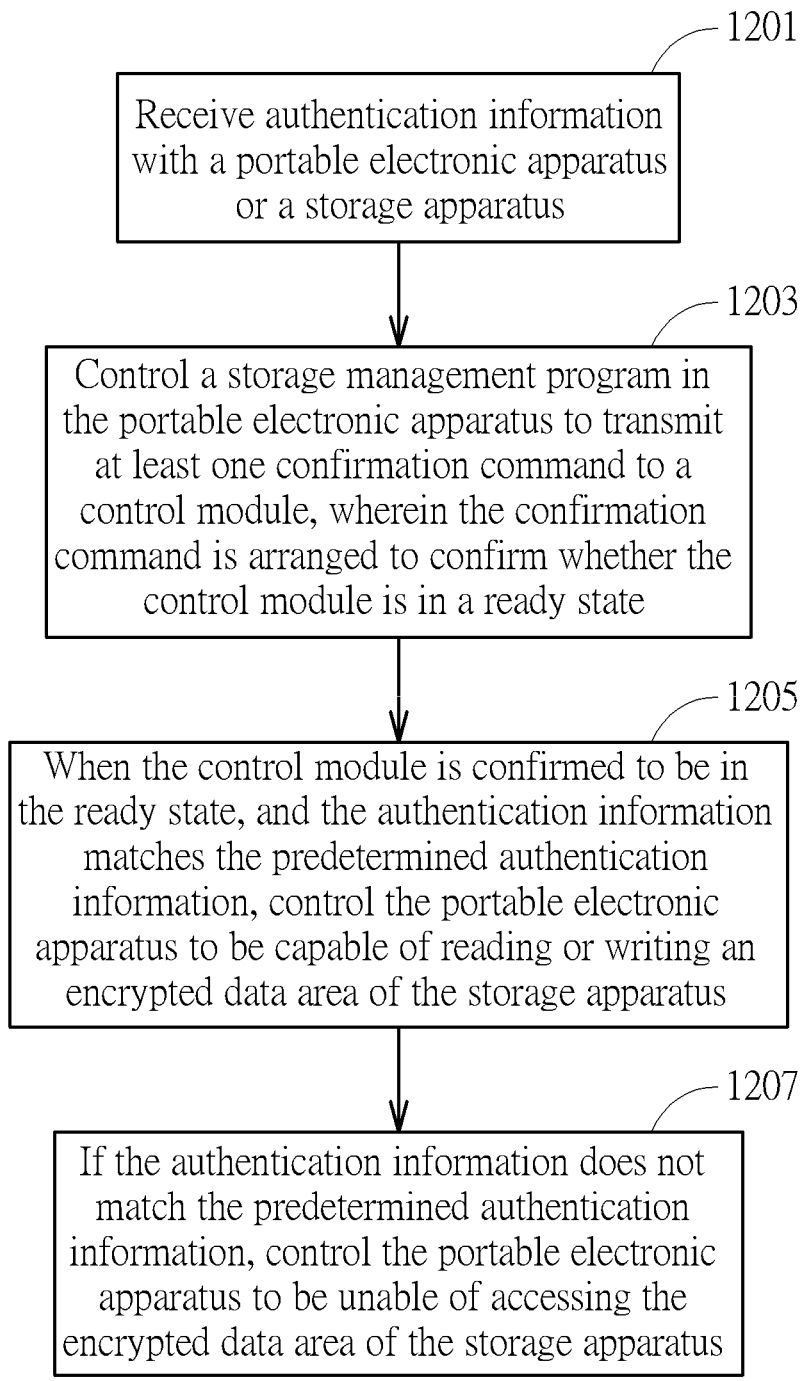
FIG. 12 is a flowchart illustrating a storage apparatus managing method according to an embodiment of the present invention.

The storage apparatus managing system provided by the present invention may also be applied to storage apparatuses other than flash disks. The storage apparatus managing method shown in FIG. 12 may be concluded from the above-mentioned embodiments, which comprises:

Step 1201: Receive authentication information with a portable electronic apparatus (such as that shown in the embodiment of FIG. 1) or a storage apparatus (such as that shown in the embodiment of FIG. 5).

Step 1203: Control a storage management program in the portable electronic apparatus to transmit at least one confirmation command (such as the confirmation command CC shown in FIG. 1 and FIG. 5) to a control module, wherein the confirmation command is arranged to confirm whether the control module is in a ready state.

Step 1205: When the control module is confirmed to be in the ready state, and the authentication information matches the predetermined authentication information, control the portable electronic apparatus to be capable of reading from or writing to an encrypted data area of the storage apparatus.

Step 1207: When the authentication information does not match the predetermined authentication information, control the portable electronic apparatus to be unable of accessing the encrypted data area of the storage apparatus.

Other potential steps can be concluded from the above-mentioned embodiments, and are omitted here for brevity.

The above-mentioned embodiments may provide proper data protection for the storage apparatus used by the portable electronic apparatus, in order to prevent the data stored in the storage apparatus from being hacked, thereby improving the convenience as well as safety of the storage apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage apparatus managing method, applied to a storage apparatus coupled to a portable electronic apparatus, the storage apparatus managing method comprising:
   (a) receiving authentication information via the portable electronic apparatus or the storage apparatus;
   (b) transmitting at least one confirmation command to a control module via a storage management program in the portable electronic apparatus, wherein the confirmation command is arranged to confirm whether the control module is in a ready state;
   (c) when the control module is confirmed to be in the ready state and the authentication information matches predetermined authentication information, controlling the portable electronic apparatus to be capable of reading from or writing to an encrypted data region of the storage apparatus; and
   (d) when the authentication information does not match the predetermined authentication information, controlling the portable electronic apparatus to be incapable of accessing the encrypted data region of the storage apparatus;
   (e) counting how many times the authentication information fails to match the predetermined authentication information in order to generate an authentication fail count; and
   (f) when the authentication fail count is not lower than an authentication fail number, performing a deletion operation to delete storage data in the storage apparatus, wherein prior to performing the deletion operation, the method further comprises:
   determining whether to terminate the deletion operation according to a termination code received by the portable electronic apparatus.

2. The storage apparatus managing method of claim 1, wherein the portable electronic apparatus is installed with a mobile operating system.

3. The storage apparatus managing method of claim 2, wherein the mobile operating system is iOS.

4. The storage apparatus managing method of claim 2, wherein the mobile operating system is Android, and a file system adopted by the storage apparatus is FAT32 or exFAT.

5. The storage apparatus managing method of claim 2, wherein the storage management program is independent from the mobile operating system.

6. The storage apparatus managing method of claim 1, wherein the storage apparatus is a flash disk.

7. The storage apparatus managing method of claim 1, wherein the confirmation command is a Test Unit Ready command.

8. The storage apparatus managing method of claim 1, wherein the storage management program is an application (App).

9. The storage apparatus managing method of claim 1, wherein the storage apparatus further comprises a public data area, and the portable electronic apparatus is allowed to read the public data area no matter whether the authentication information matches the predetermined authentication information or not.

10. The storage apparatus managing method of claim 1, wherein Step (c) comprises:
when the control module receives at least two confirmation commands and is confirmed to be in the ready state at least twice, and the authentication information is determined to match the predetermined authentication information, the control module controls the portable electronic apparatus to be capable of reading from or writing to the encrypted data area.

11. The storage apparatus managing method of claim 1, wherein the authentication information is received by the portable electronic apparatus, and the storage management program generates the confirmation command to the control module only when the authentication information matches the predetermined authentication information.

12. The storage apparatus managing method of claim 1, wherein the authentication information is received by the storage apparatus, and the storage management program generates the confirmation command to the control module continuously.

13. The storage apparatus managing method of claim 1, wherein the storage data is deleted in an irreversible manner.

14. A storage apparatus managing system, comprising:
a control module; and
a main hardware processor, wherein a portable electronic apparatus or a storage apparatus coupled to the portable electronic apparatus receives authentication information, a storage management program in the portable electronic apparatus is executed by the main processor and transmits at least two confirmation commands to the control module, and the confirmation command is at least two confirmation commands are arranged to confirm whether the control module is in a ready state;
when the control module is confirmed to be in the ready state and the control module is notified that the authentication information matches predetermined authentication information, the storage management program controls the control module to make the portable electronic apparatus capable of reading from or writing to an encrypted data area of the storage apparatus; and
when the authentication information does not match the predetermined authentication information, the storage management program controls the control module to make the portable electronic apparatus incapable of accessing the encrypted data area of the storage apparatus, wherein the storage management program further counts how many times the authentication information fails to match the predetermined authentication information in order to generate an authentication fail count; and
when the authentication fail count is not smaller than an authentication fail number, the control module controls the storage apparatus to perform a deletion operation in order to delete storage data in the storage apparatus, and wherein prior to performing the deletion operation, the storage management program determines whether to terminate the deletion operation according to a termination code.

15. The storage apparatus managing system of claim 14, wherein the portable electronic apparatus is installed with a mobile operating system.

16. The storage apparatus managing system of claim 15, wherein the mobile operating system is iOS.

17. The storage apparatus managing system of claim 15, wherein the mobile operating system is Android, and a file system adopted by the storage apparatus is FAT32 or exFAT.

18. The storage apparatus managing system of claim 15, wherein the storage management program is independent from the mobile operating system.

19. The storage apparatus managing system of claim 14, wherein the storage apparatus is a flash disk.

20. The storage apparatus managing system of claim 14, wherein the at least two confirmation commands are Test Unit Ready commands.

21. The storage apparatus managing system of claim 14, wherein the storage management program is an application (App).

22. The storage apparatus managing system of claim 14, further comprising a public data area, wherein the portable electronic apparatus is allowed to read the public data area no matter whether the authentication information matches the predetermined authentication information or not.

23. The storage apparatus managing system of claim 14, wherein the storage management program transmits the at least two the confirmation commands to the control module, when the control module receives the at least two confirmation commands within a predetermined period and is confirmed to be in the ready state at least twice, and the control module is notified that the authentication information matches the predetermined authentication information, the storage management program controls the portable electronic apparatus to be capable of reading from or writing to the encrypted data area.

24. The storage apparatus managing system of claim 14, wherein the portable electronic apparatus further comprises an authentication data receiver to receive the authentication information, and the storage management program generates the at least two confirmation commands to the control module only when the authentication information matches the predetermined authentication information.

25. The storage apparatus managing system of claim 14, wherein the portable electronic apparatus further comprises an authentication data receiver to receive the authentication information, and the storage management program generates the at least two confirmation commands to the control module continuously.

26. The storage apparatus managing system of claim 14, wherein the storage data is deleted in an irreversible manner.

* * * * *